United States Patent [19]

Modisette

[11] Patent Number: 4,504,285

[45] Date of Patent: Mar. 12, 1985

[54] SEPARATION OF CONDENSIBLE VAPORS FROM GAS MIXTURES

[75] Inventor: Jerry L. Modisette, Houston, Tex.

[73] Assignee: Modisette Incorporated, Houston, Tex.

[21] Appl. No.: 485,233

[22] Filed: Apr. 15, 1983

[51] Int. Cl.³ .................... B01D 53/22; B01D 53/24
[52] U.S. Cl. .......................................... 55/16; 55/17;
55/23; 55/158; 55/340; 55/396; 55/460
[58] Field of Search ............... 55/1, 16, 17, 23, 158,
55/340, 396, 397, 426, 460

[56] References Cited

U.S. PATENT DOCUMENTS

| 2,393,112 | 1/1946 | Lincoln | 55/340 |
| 2,676,667 | 4/1954 | Dodge . | |
| 2,816,490 | 12/1957 | Boadway et al. | 55/205 X |
| 2,857,979 | 10/1958 | van Dijck | 55/1 X |
| 3,031,825 | 5/1962 | de la Fourniere | 55/460 X |
| 3,182,674 | 5/1965 | Horton | 55/158 X |
| 3,509,932 | 5/1970 | Chambers | 55/17 X |
| 3,523,568 | 8/1970 | van Leeuwen | 55/16 X |
| 3,546,891 | 12/1970 | Fekete | 62/5 |
| 3,618,303 | 11/1971 | Nagel | 55/1 X |
| 3,710,554 | 1/1973 | Brookman | 55/236 |
| 3,957,470 | 5/1976 | Dawes | 55/17 X |
| 3,972,698 | 8/1976 | Klein et al. | 55/261 |
| 4,218,314 | 8/1980 | Schubert et al. | 55/158 X |
| 4,290,791 | 9/1981 | Matsui et al. | 55/426 X |
| 4,401,444 | 8/1983 | Teller | 55/21 X |

FOREIGN PATENT DOCUMENTS 2102914 4/1972 France ........................... 55/16

Primary Examiner—Robert Spitzer
Attorney, Agent, or Firm—Bill B. Berryhill

[57] ABSTRACT

Apparatus and method for separating condensible vapors from a gas mixture. The apparatus may include an expansion chamber of circular cross section, one end of which terminates in a converging nozzle section; a tubular separator connected to the expansion chamber, the walls of which have perforations therein; and a diffuser chamber of circular cross section, the entrance of which is a diverging nozzle section. Relatively high pressure gas and condensible vapors are introduced into the expansion chamber for isentropic expansion, cooling and increase of velocity thereof by passing through the converging nozzle. The cooled gas and entrained liquids, resulting from the cooling thereof, are passed through the tubular member, the entrained liquids passing through the perforated wall thereof for separation from the gas. The gas from which the liquids have been separated are then isentropically compressed by passing through the diverging nozzle section for exhaust through the diffuser chamber.

15 Claims, 4 Drawing Figures

SEPARATION OF CONDENSIBLE VAPORS FROM GAS MIXTURES

BACKGROUND OF THE INVENTION

1. Field of the Invention

The present invention pertains to methods and apparatus for separating vapors from gas mixtures. Specifically, it pertains to methods and apparatus for separating vapors from gas mixtures by condensation.

2. Brief Description of the Prior Art

Vapors are conventionally separated from gas mixtures by condensation, absorption and adsorption. Vapor separation by condensation requires low temperatures for efficient operation. Conventional condensation separators use externally powered refrigeration systems to achieve the requisite low temperatures. Even utilizing heat exchangers for efficient heat recovery, the energy cost of such a system is high.

Another type of conventional vapor separator uses the Joule-Thomson effect produced by expansion of gas mixtures from high pressure through throttling valves (commonly called expansion valves) to reach temperatures low enough for condensation. The Joule-Thomson effect requires very high pressures for most substances and does not produce large decreases in temperature so that extensive precooling is necessary. This requires recovery heat exchangers or external refrigeration.

Another type of conventional vapor separator utilizes isentropic expansion in a turbine or other mechanical device to extract mechanical energy of expansion in order to reach low temperatures. While isentropic expansion can produce very low temperatures with modest pressure decreases, the mechanical devices are complex and expensive, and are generally only feasible for large installations.

There are many variations of the above separating processes, as well as processes for separating liquids from other liquids and solid matter from liquids or gases. A few examples of such may be seen in U.S. Pat. Nos. 2,676,667; 2,816,490; 3,546,891; 3,710,554; and 3,972,698.

SUMMARY OF THE INVENTION

Isentropic expansion can be achieved in a nozzle, the expansion energy being utilized to accelerate the gas. In this manner, very low temperatures can be reached. However, after being expanded in a nozzle, the gas is moving at very high velocities, making separation of condensed vapors therefrom very difficult. In the present invention a swirling nozzle is utilized to reach low temperatures through isentropic expansion of gas. However, most of the expansion energy is utilized to accelerate the tangential component of the flow so that the centrifugal force tends to remove the condensed vapors in the gas stream therefrom.

The apparatus of the present invention includes an expansion chamber of circular cross section, having a tangential inlet by which high pressure gas mixtures are admitted thereto for swirling movement expansion and cooling therein. One end of the expansion chamber terminates in a converging nozzle section through the throat of which the cooled gas mixture exits the expansion chamber. A tubular separator is connected to the expansion chamber and into which the cooled gas mixture passes from the throat of the expansion chamber. The walls of the tubular separator are provided with perforations through which the vapors condensed from the gas mixture may pass. A diffuser chamber of circular cross-section is provided with a diverging nozzle section through the throat of which gases separated from the condensed vapors in the tubular separator pass into the diffuser chamber for exhaustion through a tangential outlet provided therein.

Thus, the separation apparatus of the present invention utilizes a swirling nozzle for expanding a gas mixture in which most of the expansion energy is used to impart tangential motion to the gas mixture. The gas mixture is cooled to a very low temperature. The cold swirling gas mixture then passes through the nozzle throat into the tubular separator where centrifugal force drives condensed vapor droplets through the perforated walls thereof. The remaining gas passes into a swirling diffuser compressing the gas to recover most of the original pressure.

The resulting separating apparatus of the present invention is extremely simple in construction, operation, and maintenance. It is extremely energy efficient. Many other objects and advantages of the invention will be seen from reading the description which follows in conjunction with the accompanying drawings.

DESCRIPTION OF PREFERRED EMBODIMENTS

Figure 1:
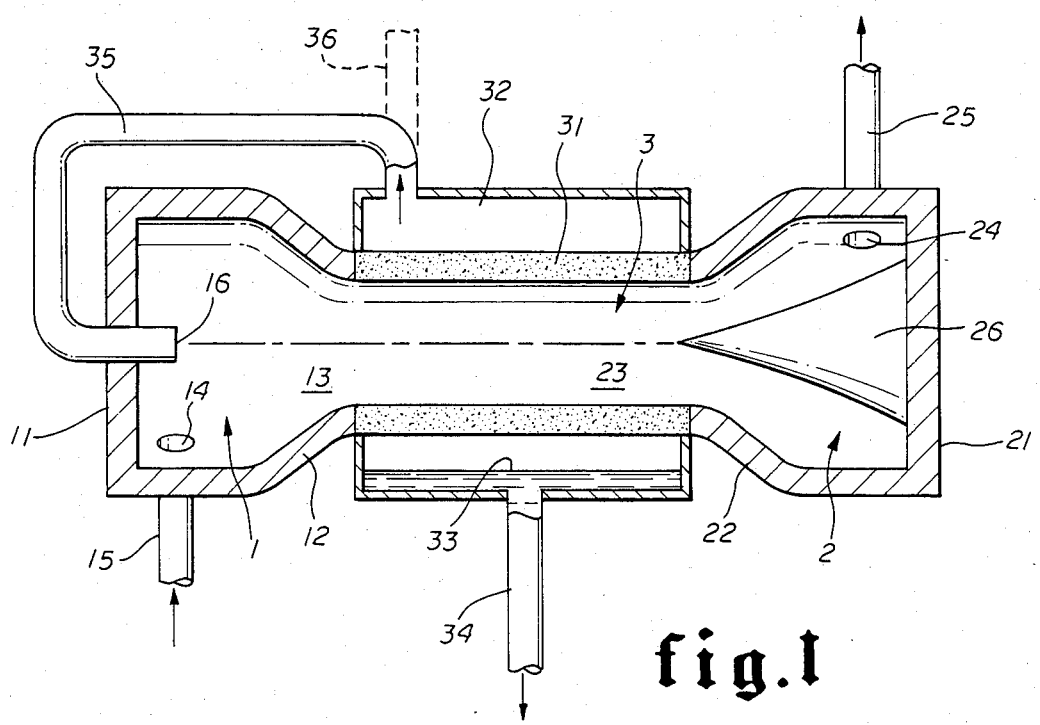
FIG. 1 is an elevation view of apparatus for separating condensible vapors from a gas mixture according to a preferred embodiment of the invention.

Referring first to FIG. 1, a preferred embodiment of the invention will be described for separating condensible vapors from a gas mixture. The main components of the apparatus are an expansion chamber 1 and a diffuser chamber 2 connected by a tubular separator 3.

The expansion chamber 1 is of circular cross section and closed at one end by a plate or end wall 11. The opposite end of the expansion chamber terminates in a converging nozzle section 12 with a throat 13. The expansion chamber 1 is provided with a tangential inlet 14 by which high pressure gas mixtures may be admitted to the expansion chamber 1 for swirling movement therein. A conduit 15 connects the inlet 14 to a high pressure gas source or to a compressor (not shown). It will be noted that the exit or throat 13 of the nozzle section 12 is of a smaller diameter than the distance between the tangential inlet 14 and the axis of the expansion chamber 1.

The diffuser chamber 2 is also of a circular cross section and closed at one end by a plate or end wall 21. The entrance of the diffuser chamber 2 is formed by a diverging nozzle section 22 having a throat 23. The diffuser chamber 2 is provided with a tangential outlet 24 and conduit 25 by which the gases may be exhausted from the apparatus. The distance from the axis of the diffuser chamber 2 to the tangential outlet 24 is greater than the diameter of the nozzle throat 23. Coaxially disposed in the diffuser 2 is a substantially conical flow guide 26, the apex of which is near the entrance or throat 23 of the diffuser chamber 2 and the base of which rests against the end wall 21.

The tubular separator 3 which connects the expansion chamber 1 and the diffuser chamber 2 includes cylindrical walls 31 which are porous or perforated so as to allow the passage of certain fluids. The terms "porous" and "perforated" are used interchangeably herein. Capillary action of the pores or perforations will cause liquid droplets to be absorbed preventing reentrainment into gas flow through the tubular separator 3. An annular chamber 32 may be formed around the walls 31 of the tubular separator 3 providing a receptacle into which liquid may collect at 33 for discharge through outlet 34 for collection thereof. The upper portion of the chamber 32 may be connected via conduit 35 to a low pressure region 16 in the expansion chamber 1. Thus, at least a partial vacuum may be created in the chamber 32 to aid in the passage of liquids through the perforated walls 31. As an alternative, the chamber 32 may be connected via conduit 36 to a vacuum pump or the like.

The separating apparatus of FIG. 1 operates in the following fashion. A relatively high pressure gas mixture containing condensible vapors is introduced into the expansion chamber 1 through the conduit 15 and tangential inlet 14. The gas mixture expands and swirls in the chamber 1 and exits through the throat 13 of the converging nozzle section 12. Since the throat 13 is a smaller diameter than the distance of the tangential inlet 14 from the axis of the expansion chamber 1, conservation of angular momentum causes the tangential velocity of the gas mixture to increase producing an approximately isentropic expansion, cooling the gas mixture to a low temperature. At the low temperature, vapor in the gas mixture condenses into liquid droplets which are initially entrained in the gas flow.

The gas mixture, with entrained vapor droplets, passes into the tubular separator 3. Due to centrifugal force created by the swirling action in the expansion chamber 1, the liquid droplets move outwardly toward the perforated or porous walls 31. The centrifugal force and capillary action of the porous walls 31 prevents the fluids from being reentrained into the gas flow. The liquid drips from the external surface of the walls 31 into the lower portion of the chamber 32 where it collects at 33 and is removed through the outlet 34. Passage of the liquids through the walls 31 may also be aided by a partial vacuum source. In the embodiment of FIG. 1, this partial vacuum source is supplied by connecting the upper portion of the chamber 32 through the conduit 35 to a low pressure region 16 on the axis of the nozzle section 12 of the expansion chamber 1. As previously mentioned, the vacuum may also be created by a vacuum pump or the like connected through a conduit 36.

The gas from which the liquid is removed passes from the tubular separator 3 into the diffuser chamber 2 through the throat 23 of the nozzle section 22. From the diffuser chamber 2 the gas exits through the tangential outlet 24 and conduit 25 for further handling. Since the distance from the axis of the diffuser chamber 2 to the tangential outlet 24 is greater than the diameter of the throat 23, conservation of angular momentum reduces the tangential velocity, producing an approximately isentropic compression. The flow guide 26 aids in smoothing the flow of gas to the outlet 24. The diffuser is made appropriately larger or smaller than the nozzle to provide for the loss of gas as condensed vapor, and for the expansion of gas due to heating by the latent heat of vaporization in the condensing liquid.

Figure 2:
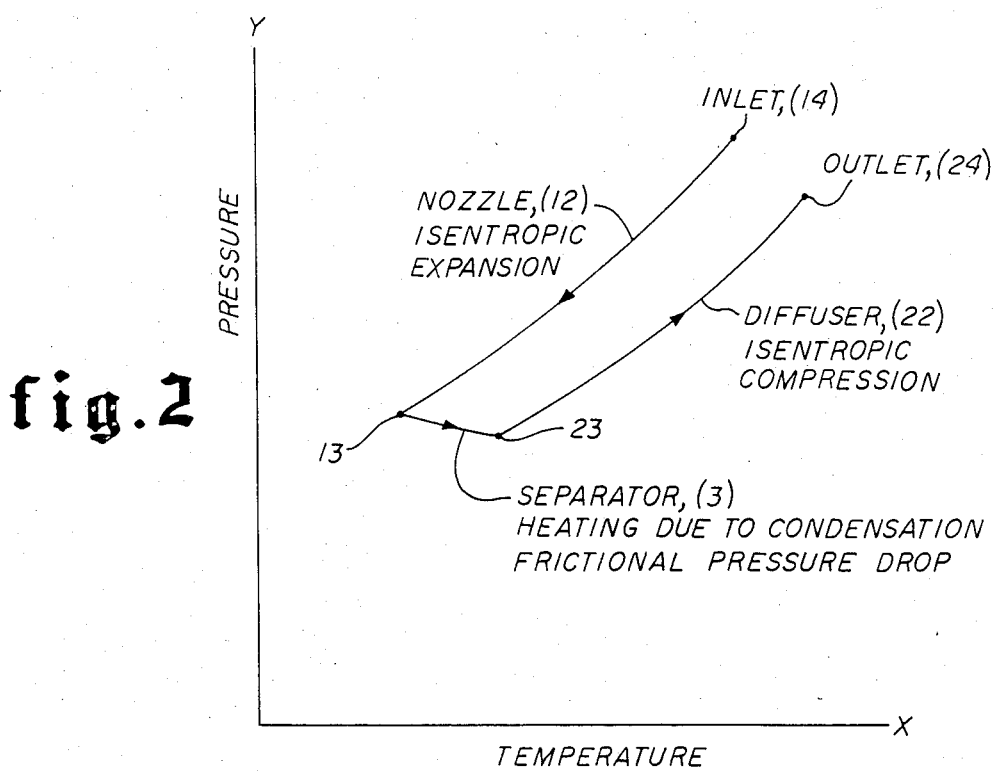
FIG. 2 is a diagram illustrating the thermodynamic cycle of the separating apparatus of the present invention.

The thermodynamic cycle of the just described process is shown in FIG. 2 with the X axis representing temperature and the Y axis pressure. Beginning at the inlet (14 in FIG. 1) the gas enters at a relatively high pressure. It is expanded by isentropic expansion through the nozzle (12), reaching its lowest pressure and temperature at the throat (13). From the throat (13) the gas mixture passes through the separator (3) where the liquid is separated as previously described. In this portion of the cycle, there is some heating due to condensation and frictional pressure drop. Exiting the tubular separator (3) through the throat (23) of the diffuser the dried gases enter the diffuser nozzle (22) where it is isentropically compressed reaching its highest pressure at the outlet 24.

Figure 3:
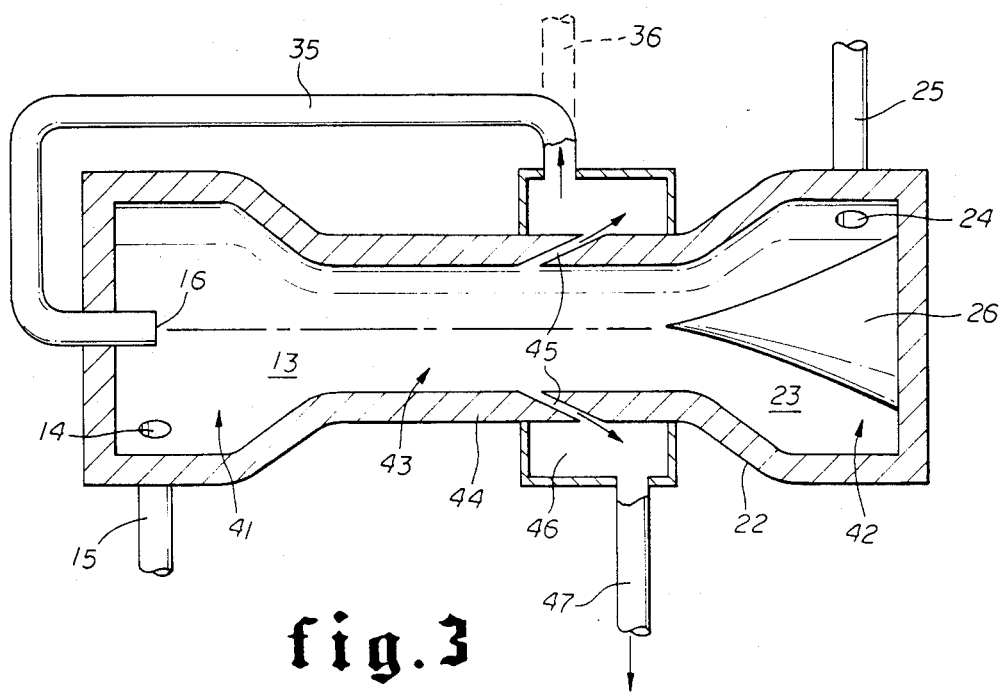
FIG. 3 is an elevation view partially in section of apparatus for separating condensible vapors from the gas mixture according to an alternate embodiment of the invention.

Referring now to FIG. 3, there is shown an alternate embodiment of the invention having an expansion chamber 41 and diffuser chamber 42 very similar to the ones shown in FIG. 1. Thus, the same reference numbers will be given to the components of the expansion chamber 41 and diffuser chamber 42 as were given to like components of expansion chamber 1 and diffuser chamber 2 in FIG. 1.

Like in the previous embodiment, the expansion chamber 41 and diffuser chamber 42 are connected by a tubular section or separator portion 43. However, instead of having porous walls as in the embodiment of FIG. 1, the walls 44 are provided with one or more ducts 45, the flow paths of which diverge outwardly from the axis of the tubular separator section 43 toward the diffuser chamber 42. This configuration does not disturb the high velocity flow of the gas in the tubular separator 43. Due to the centrifugal force of the gas in the entrained liquids therewith, the liquids are forced through the ducts 45 into the surrounding annular chamber 46 for exit through conduit 47. A small quantity of gas may be removed with the liquids. In the case where some gas is removed with liquids, gas may be returned to the system through the conduit 35.

The embodiment of FIG. 3 is particularly useful for liquids which will not wet the walls of the tubular separator section 43, making capillary absorption impossible. In addition, the alternate embodiment of FIG. 3 is particularly useful for very viscous liquids which will not flow rapidly through the porous wall of the embodiment of FIG. 1. As in the embodiment of FIG. 1, flow of liquids through the ducts 45 may be aided by keeping the annular chamber 46 under at least a partial vacuum. This may be accomplished by connecting the chamber 46 through conduit 35 to the lower pressure region 16 of the expansion chamber 41. Alternatively, a vacuum pump may be connected to the chamber 46 through conduit 36. The thermodynamic cycle of this embodiment is the same as the embodiment of FIG. 1 as illustrated in FIG. 2.

Figure 4:
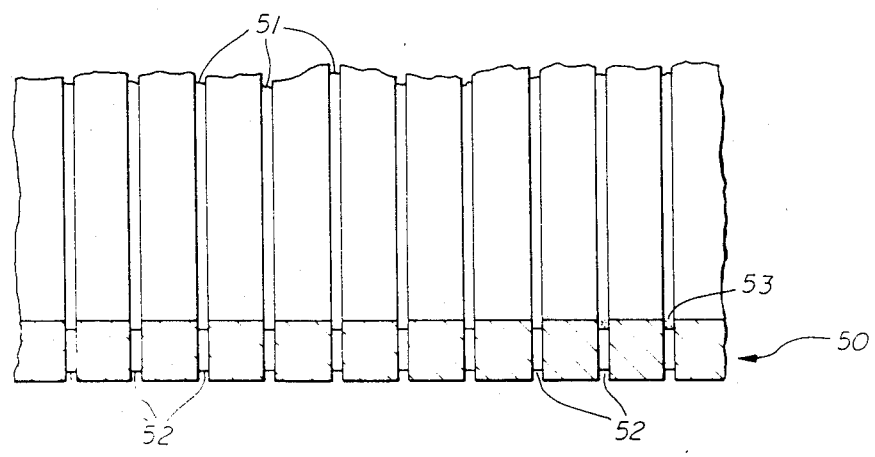
FIG. 4 is a detailed sectional view of the walls of a tubular separator utilized with still another alternate embodiment of the invention.

In FIG. 4, still another alternate embodiment of the invention is illustrated. In this drawing, only the wall 50 of the tubular separator section such as the wall 31 of the embodiment of FIG. 1 and the wall 44 of the embodiment of FIG. 3 is shown. The wall 50 of FIG. 4 is provided with internal grooves 51. These grooves communicate with the exterior of the wall 50 through outlets or holes 52. Thus, any liquid entrained in gases passing through the tubular separator 43 are first collected in the grooves 51 exiting eventually through the passages or holes 52 for collection in an annular chamber similar to the annular chambers 32 of FIG. 1 and 46 of FIG. 3. This embodiment is especially effective in preventing reentrainment of liquids into the high velocity gas stream.

Thus, the apparatus of the present invention provides a means for separating condensible vapors from a gas mixture of simple construction, operation and maintenance. It utilizes a swirling nozzle for expanding the gas mixture in which most of the expansion energy is used to impart tangential motion to the gas mixture. The gas mixture is cooled to a very low temperature and the cold swirling gas mixture then passes through a tubular separator where centrifugal force drives condensed vapor droplets through perforated walls. The remaining gas passes into a diffuser which compresses the gas recovering most of the original pressure. Thus, the separation is extremely energy efficient.

Several embodiments of the invention have been described herein. Additional variations can be made without departing from the spirit of the invention. Accordingly, it is intended that the scope of the invention be limited only by the claims which follow.

I claim:

1. Apparatus for separating condensible vapors from a gas mixture comprising:
   an expansion chamber of circular cross-section having a tangential inlet by which high pressure gas mixtures are admitted thereto for swirling movement, expansion and cooling therein, one end of said expansion chamber terminating in a converging nozzle section through the throat of which said cooled gas mixture exits said expansion chamber;
   a tubular separator connected to said expansion chamber and into which said cooled gas mixture passes from the throat of said expansion chamber, the walls of said tubular separator having perforations therein through which vapors condensed from said gas mixture in said cooling thereof may pass; and
   a diffuser chamber of circular cross-section the entrance of which is formed by a diverging nozzle section through the throat of which gases separated from said condensed vapors in said tubular separator pass into said diffuser chamber for recompression and exhausting through a tangential outlet provided therein.

2. Apparatus as set forth in claim 1 including a chamber surrounding said tubular separator for collecting condensed vapors passing through said perforations in said walls of said tubular separator, said chamber having an outlet through which said collected condensed vapors may be removed.

3. Apparatus as set forth in claim 2 in which said chamber is connected by a conduit to means for maintaining at least a partial vacuum therein.

4. Apparatus as set forth in claim 3 in which said conduit is connected to the low pressure area of said expansion chamber at the axis of said nozzle section.

5. Apparatus as set forth in claim 1 in which said perforations comprise one or more ducts in said tubular separator walls, the flow paths of which diverge outwardly from the axis of said tubular separator and toward said diffuser chamber.

6. Apparatus as set forth in claim 1 in which said perforations include circular grooves on the inner walls of said tubular separator.

7. Apparatus as set forth in claim 1 including a substantially conical flow guide coaxially disposed in said diffuser chamber, the apex thereof being near the entrance of said diffuser chamber and the base thereof being near said tangential outlet for smoothing the flow of gases being exhausted through said tangential outlet.

8. Apparatus as set forth in claim 1 in which the distance from said tangential inlet to the axis of said expansion chamber is greater than the diameter of said converging nozzle throat.

9. Apparatus as set forth in claim 8 in which the distance from the axis of said diffuser chamber to said tangential outlet is greater than the diameter of said diverging nozzle throat.

10. Apparatus as set forth in claim 1 in which the distance from the axis of said diffuser chamber to said tangential outlet is greater than the diameter of said diverging nozzle throat.

11. A method of separating condensible vapors from a gas mixture comprising the steps of:
    introducing relatively high pressure gas and condensible vapors into a chamber of circular cross-section for swirling movement therein;
    isentropically expanding and cooling said gas and condensible vapors to convert said condensible vapors to liquid while increasing the velocity thereof by passing said gas and entrained liquids through a converging nozzle;
    passing said cooled gas and entrained liquids, resulting from said cooling, through a perforated walled tubular member, said entrained liquids passing through said perforated wall for separation from said gas; and
    isentropically compressing the gas from which said liquids have been separated by passing said gas through a diverging nozzle.

12. A method of separating condensible vapors from a gas mixture as set forth in claim 11 in which said perforated wall tubular member is surrounded by a collection chamber in which said liquids passing through said perforated wall may be collected for removal therefrom.

13. A method of separating condensible vapors from a gas mixture as set forth in claim 12 in which said collection chamber is maintained at at least a partial vacuum by a vacuum pump.

14. A method of separating condensible vapors from a gas mixture as set forth in claim 12 in which said collection chamber is maintained at at least a partial vacuum by connecting said collection chamber in fluid communication with a low pressure area of said converging nozzle.

15. A method of separating condensible vapors from a gas mixture as set forth in claim 11 in which said high pressure gas and condensible vapors are introduced into said chamber tangentially with said circular cross section to create said swirling movement therein and to impart centrifugal force to said entrained liquids in said tubular member aiding in said passing of said liquids through said perforated wall.

* * * * *